Oct. 30, 1945.  A. G. HARRIS  2,387,728
INTERNAL-COMBUSTION ENGINE
Filed Feb. 4, 1943   2 Sheets-Sheet 1

Arthur G. Harris,
INVENTOR.

BY
Victor J. Evans & Co.
ATTORNEYS

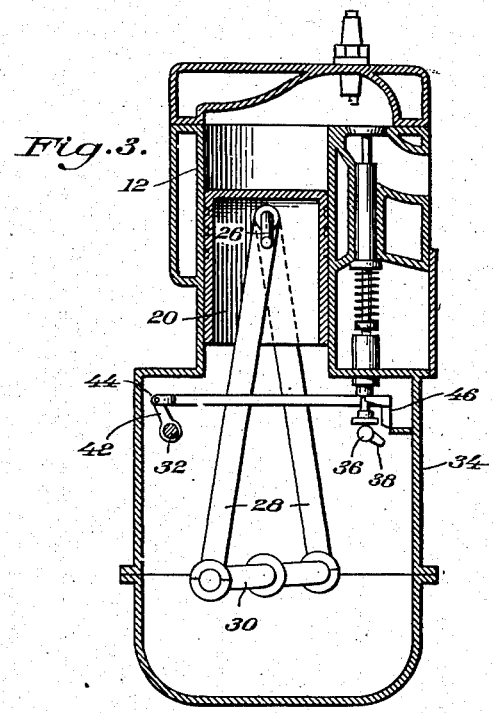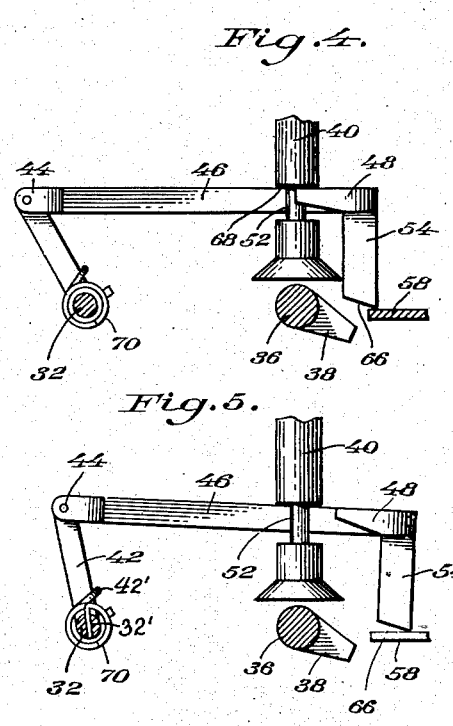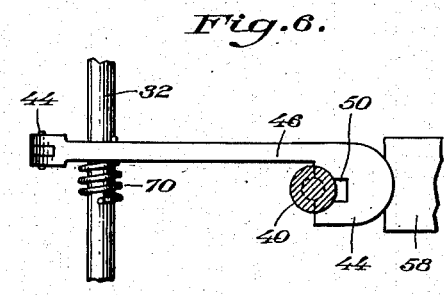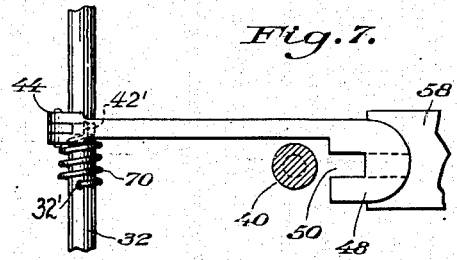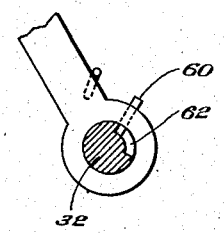

Patented Oct. 30, 1945

2,387,728

UNITED STATES PATENT OFFICE 2,387,728

INTERNAL-COMBUSTION ENGINE

Arthur G. Harris, Palisade, Colo.

Application February 4, 1943, Serial No. 474,731

2 Claims. (Cl. 123—182)

My invention relates to internal combustion engines, and has among its objects and advantages the provision of an improved variable stroke engine and exhaust valve control.

In the accompanying drawings:

Figure 3 is a view taken along the line 3—3 of Figure 2;

Figure 4 is a detail view of one of the exhaust valve controls;

Figure 5 is a similar view illustrating the exhaust valve control in its inoperative position;

Figure 6 is a top view of the structure of Figure 4;

Figure 7 is a top view of the structure of Figure 5; and

Figure 8 is a sectional detail view of a portion of the exhaust valve control.

Figure 1:
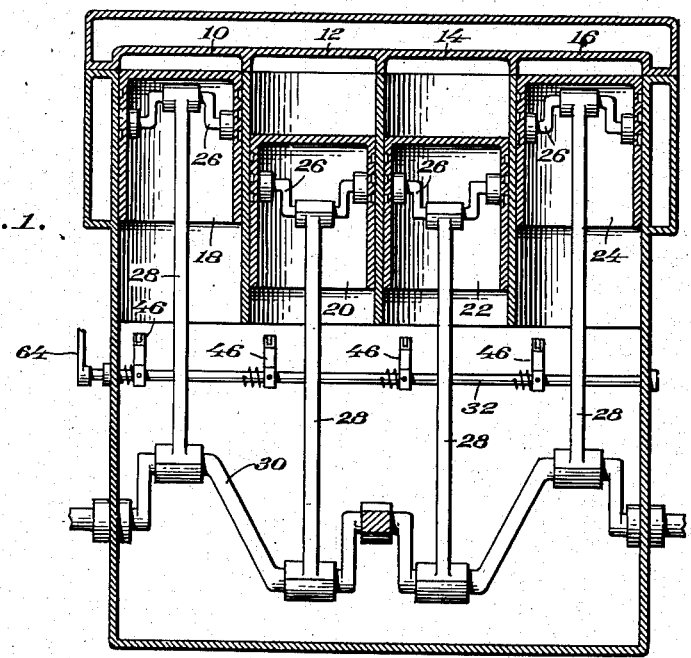
Figure 1 is a vertical sectional view of the engine.
Figure 2:
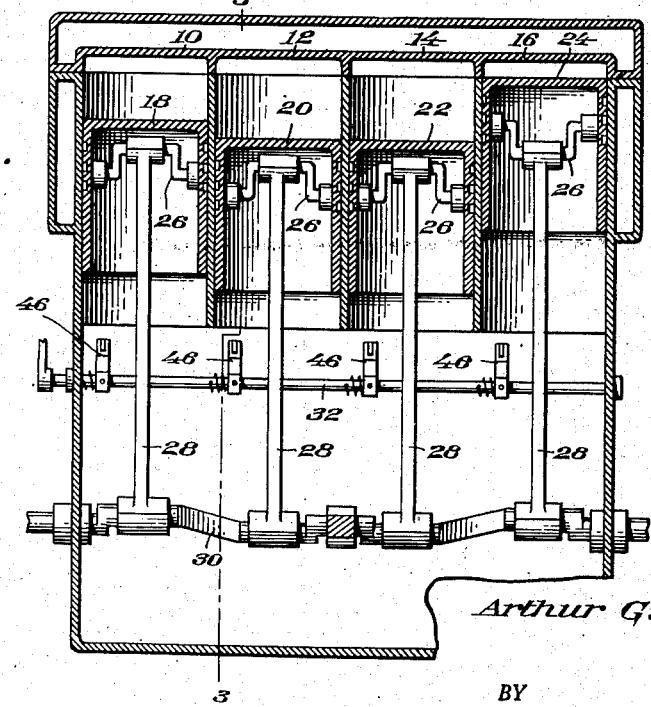
Figure 2 is a similar view with the pistons and crank shaft in different positions.

In the embodiment selected for illustration, Figures 1 and 2 illustrate an engine having cylinders 10, 12, 14 and 16. The engine may comprise any number of cylinders. Pistons 18, 20, 22 and 24 are slidable in the respective cylinders 10 through 16. A short throw crank 26 is mounted in each piston, and each crank is operatively connected with a connecting rod 28 connected with the usual crank shaft 30. All the cranks 26 are rotatably mounted in their respective pistons.

In Figure 1, the piston 18 is at top dead center, which is also true of the crank 26 of that piston as well as the crank arm of the crank shaft 30. When the explosion occurs in the cylinder 10, the piston 18 is driven downwardly with the crank 26 remaining at top dead center. Upon completion of one revolution of the crank shaft 30, the piston 18 is returned to the position shown. Upon completion of the exhaust stroke, the piston 18 will dwell for a period as the crank 26 is rotated to bottom dead center, after which the piston is pulled downwardly to the positions indicated by pistons 20 and 22. Thus the piston 18 is characterized by a short intake stroke, which is also true of its compression stroke. The pistons move through their long strokes during the explosion and exhaust phases.

In the event that the fuel charge in the cylinder 18 fails to fire, there is no driving force on the piston 18 with the result that the crank 26 will be rotated one-half revolution before its connecting rod 28 pulls it downwardly in the cylinder. When the piston 18 is pulled downwardly by the connecting rod 28, the crank 26 will be at its bottom dead center position as the connecting rod starts its upward movement. Thus the piston 18 is characterized by a relatively short stroke in the event of misfire. This action prevents a full charge from being drawn into the cylinder with a resulting saving in fuel. All the cylinders and their respective pistons operate in the same manner.

To facilitate starting of the engine, means are provided for opening the exhaust valves prior to their normal opening. A shaft 32 is rotatably mounted in the crank case 34 in parallelism with the cam shaft 36 having a cam 38 for actuating one of the exhaust valve tappets 40. To the shaft 32 is loosely connected an arm 42, there being one such arm for each exhaust valve tappet. The outer end of the arm 42 is pivotally connected at 44 with a tappet latch 46 having a latch head 48 slotted at 50 to receive the small diameter length 52 of the tappet. This head is provided with a depending member 54 normally resting on a support 58.

A pin 60 is secured to each of the arms 42 for free movement in a circumferential recess 62 in the shaft 32. Normally the tappet latches 46 are in the position of Figures 5 and 6, which position is determined through rotation of the shaft 32. This shaft is provided with a manual control accessible by the operator of the vehicle, which control is in the form of a crank 64 attached to the shaft on the outside of the crank case. When the tappet latch is moved to the position of Figure 4, the length 52 is located in the slot 50 which brings the cam end 66 into the path of the cam 38 so that the tappet 40 will be lifted sooner than when engaged directly by the cam 38, since the head 48 engages the shoulder 68 on the tappet as soon as the cam 38 is brought into engagement with the cam end 66.

A spring 70 has one end connected with the arm 42 at 42' and its other end fixedly secured to the shaft 32 at 32'. One such spring is provided for each arm 42. Rotation of the shaft 32 imparts simultaneous movement to the arms 42. This arrangement allows a resilient connection between the shaft and the arm.

Should one of the tappets 40 be in such position as to prevent its latch 46 from being brought into its tappet lifting position, the other tappet latch or latches may be brought into latching positions through yielding of the spring 70 connected with the latch 46 obstructed by its respective tappet 40. The obstructed latch 46 is brought into its tappet lifting position by its spring 70 as soon as the cam 38 has been moved out of engagement with that tappet. The pins 60 provide a lost motion connection between the arms 42 and the shaft 30 of a sufficient range to permit proper functioning of the springs 70.

Without further elaboration, the foregoing will so fully illustrate my invention, that others may, by applying current knowledge, readily adapt the same for use under various conditions of service.

I claim:

1. In a compression relief device for internal combustion engines having exhaust valve tappets and cam means for actuating said tappets, each tappet formed with a circumferential groove providing a reduced portion and a shoulder above and below the reduced portion, a rotary shaft, an arm on the shaft keyed for limited independent pivotal movement, a slidable member pivotally connected with said arm, means on the slidable member for engaging in the groove in the tappet to contact the shoulders when moved in one direction by rotation of the shaft, a camming element on said means adapted to be engaged by the tappet cam operating device to lift the tappet advancedly of its normal actuation by the tappet cam operating device, a resilient connection between the shaft and the arm for yieldingly biasing the slidable member into operable relationship with the tappet, and means for rotating the shaft.

2. In a compression relief device for internal combustion engines having exhaust valve tappets and cam means for actuating said tappets, each tappet formed with a circumferential groove providing a reduced portion and a shoulder above and below the reduced portion, a manually operated rotary shaft, an arm keyed to the shaft for limited independent pivotal movement, a slidable member pivotally connected with the said arm, a slotted latch head on the slidable member for engaging in the groove in the tappet to contact the shoulders when moved in one direction by rotation of the shaft, a depending camming element on said latch head adapted to be engaged by the tappet cam operating device to lift the tappet advancedly of its normal actuation by the tappet cam operating device, and a spring connection between the shaft and the arm for yieldingly biasing the slidable member into operable relationship with the tappet.

ARTHUR G. HARRIS.